(12) United States Patent
Wang et al.

(10) Patent No.: US 10,009,781 B1
(45) Date of Patent: Jun. 26, 2018

(54) METHOD AND APPARATUS FOR REDUCING RETRANSMISSIONS IN LOCAL AREA NETWORKS

(71) Applicant: Marvell International LTD., Hamilton (BM)

(72) Inventors: Lei Wang, San Diego, CA (US); Yakun Sun, Sunnyvale, CA (US); Liwen Chu, San Ramon, CA (US); Jinjing Jiang, San Jose, CA (US); Hongyuan Zhang, Fremont, CA (US); Hui-Ling Lou, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 184 days.

(21) Appl. No.: 14/697,106

(22) Filed: Apr. 27, 2015

Related U.S. Application Data

(60) Provisional application No. 61/986,750, filed on Apr. 30, 2014.

(51) Int. Cl.
| | |
|---|---|
| *H04W 24/08* | (2009.01) |
| *H04W 28/02* | (2009.01) |
| *H04L 12/26* | (2006.01) |
| *H04W 72/02* | (2009.01) |
| *H04W 84/12* | (2009.01) |

(52) U.S. Cl.
CPC ............ *H04W 24/08* (2013.01); *H04L 43/12* (2013.01); *H04W 28/0231* (2013.01); *H04W 28/0284* (2013.01); *H04W 72/02* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2009/0154436 A1* | 6/2009 | Choi | ............... | H04W 72/1242 370/338 |
| 2012/0213166 A1* | 8/2012 | Benveniste | ........... | H04W 56/00 370/329 |

OTHER PUBLICATIONS

"Specification of the Bluetooth System" Master Table of Contents & Compliance Requirments—Covered Core Package version: 4.0; Jun. 30, 2010; 2302 Pages.
IEEE 802.16; IEEE Standard for Local and Metropolitan area networks; Part 16: Air Interface for Broadband Wireless Access Systems; IEEE Computer Society and IEEE Microwave Theory and Techniques Society; May 29, 2009; 2082 Pages.

(Continued)

*Primary Examiner* — Chi H Pham
*Assistant Examiner* — Raul Rivas

(57) ABSTRACT

A wireless device including a metric generating module and a parameter selecting module. The metric generating module is configured to generate a first metric based on (i) a number of frames retransmitted over a first time period, and (ii) a total number of frames transmitted over the first time period. The metric generating module is configured to generate a second metric based on (i) a number of frames received more than once over a second time period, and (ii) a total number of frames received over the second time period. The parameter selecting module is configured to select one or more transmission parameters to transmit data based on one or more of the first metric and the second metric.

3 Claims, 6 Drawing Sheets

(56) References Cited

OTHER PUBLICATIONS

IEEE 802.20; IEEE Standard for Local and Metropolitan Area Networks; Part 20: Air Interface for Mobile Broadband Wireless Access Systems Supporting Vehicular Mobility—Physical and Media Access Control Layer Specification: IEEE Computer Society; Aug. 29, 2008; 1053 Pages.
IEEE P802.11-REVmc™/D2.6, Apr. 2014, Draft Standard for Information Technology—Telecommunications and information exchange between systems Loal and metropolitan area networks—Specific requirements; Part 11: Wireless LAN Medium Access Control (MAC) and Phsycial Layer (PHY) Specifications; Apr. 2014; 3577 Pages.
IEEE P802.11ac™/D5.0; Draft Standard for Information Technology—Telecommunications and information exchange between systems—Local and metropolitan area networks—Specific requirements: Part 11: Wireless LAN Medium Access Control (MAC) and Physcial Layer (PHY) specifications: Amendment 4: Enhancements for Very High Throughput for Operation in Bands below 6 GHz; Jan. 2013; 440 Pages.
IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 Pages.
IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.
IEEE Std. P802.11ad/D5.0; Draft Standard for information technology—Telecommunications and information exchange between systems Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band; Sep. 2011; 601 Pages.
Jindal, Nihar, Porat, Ron; Improved Spatial Reuse Feasibility—Part II; IEEE 802.11-14/0083r0; Jan. 29, 2014.
Ketonen, Veli-Pekka; "WLAN QoE, End User Perspective Opportunities to Improve" IEEE 802.11-13/0545r1; May 15, 2013.
Mano, Hiroshi; Morioka, Hitoshi; Yunoki, Katsuo; Emmelmann, Marc; "Experimental Test Report of FILS" IEEE 11-13/0323r2; Mar. 18, 2013.
Yunoki, Katsuo, Misawa, Yasunao; "Some Findings from Real World Measurement" IEEE 11-14/0061r0; Jan. 17, 2014.
Yunoki, Katsuo; Ohara, Akira; "Real Air-Time Occupation by Beacon and Probe"; IEEE 11-11/1413r3; Jan. 16, 2012.
IEEE P802.11aa/IEEE Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 2: MAC Enhancements for Robust Audio Video Streaming, May 29, 2012; 161 pages.

\* cited by examiner

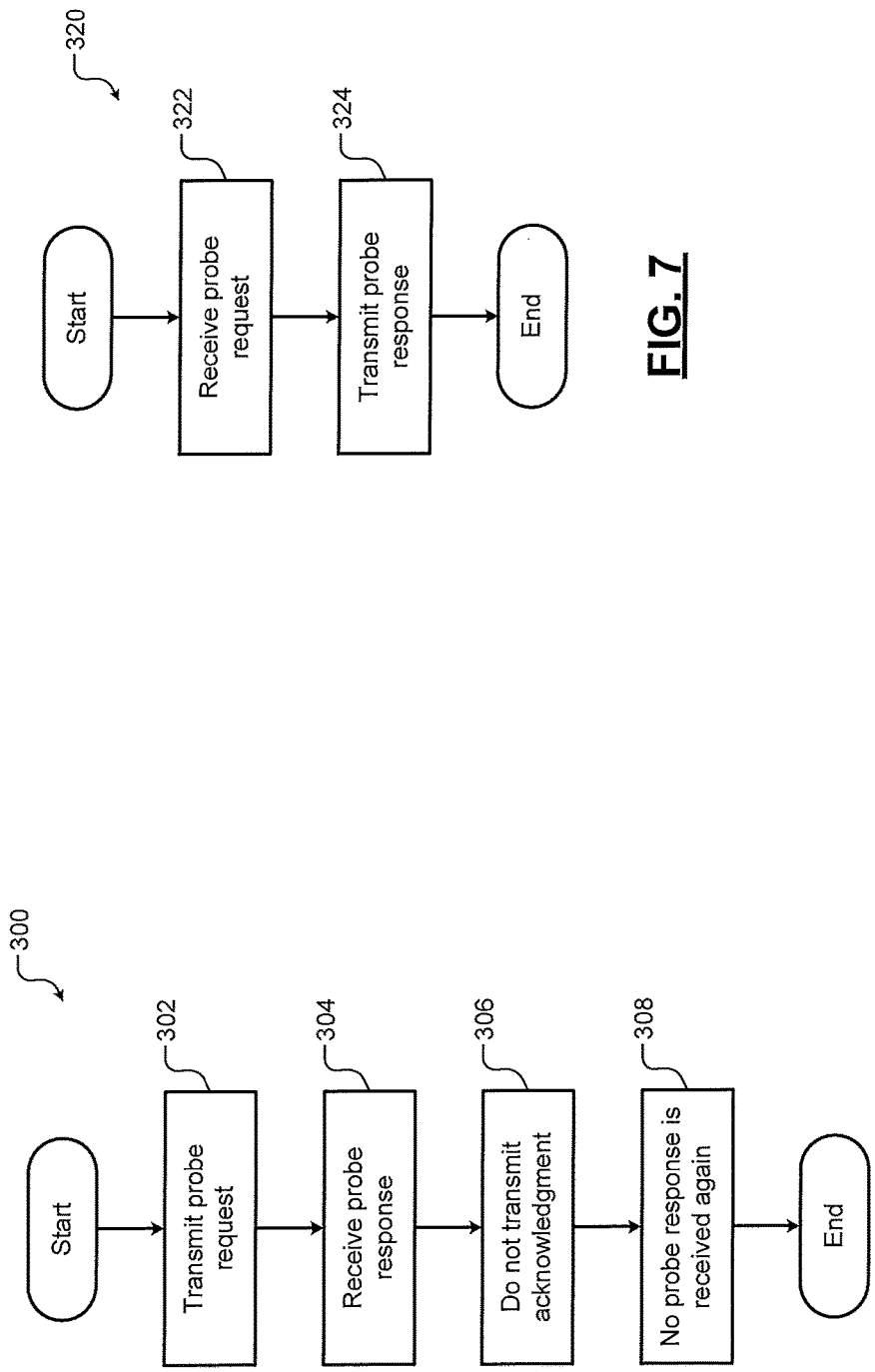

METHOD AND APPARATUS FOR REDUCING RETRANSMISSIONS IN LOCAL AREA NETWORKS

CROSS-REFERENCE TO RELATED APPLICATIONS

This application claims the benefit of U.S. Provisional Application No. 61/986,750, filed on Apr. 30, 2014. The entire disclosure of the application referenced above is incorporated herein by reference.

FIELD

The present disclosure relates generally to wireless communications and more particularly to reducing retransmissions in wireless local area networks.

BACKGROUND

In wireless local area networks governed by IEEE 802.11 standards, some frames may be retransmitted as part of channel access mechanism for contention-based medium access control to provide more reliable data transportation over a wireless link. Examples of retransmitted frames include individually addressed data frames and management frames as well as request-to-send (RTS) frames. Retransmissions may also occur for groupcast audio/video streams (e.g., in 8002.11aa and 802.11ad).

A retransmission may be triggered by one or more events. Examples of the events include a timeout that can occur if an acknowledgment (ACK) for a transmitted frame is not received (ACKTimeout), a timeout that can occur if a clear-to-send (CTS) frame in response to an RTS frame is not received (CTSTimeout), or receipt of a frame other than an expected ACK frame or CTS frame. Retransmissions may be performed using a backoff procedure with an exponentially increasing contention window. Retransmissions may be managed by using multiple retry counts and by limiting number of retries as specified in respective standards.

There can be many possible causes for retransmissions. For example, retransmissions can be caused by packet loss or packet error. Packet loss can occur when a receiver cannot decode a received packet at all. A packet error can occur when the receiver can decode part of a frame (e.g., a Physical Layer (PHY) preamble and Physical Layer Convergence Protocol (PLCP) header/signal (SIG) fields) but cannot correctly decode the entire frame (e.g., Frame Check Sequence (FCS) checking failures).

Packet loss or packet error can occur due to many reasons. Examples of the reasons include packet collisions. For example, packet collisions can be caused by hidden nodes and overlapping basic service sets (OBSSs). For example, in active scanning, a client station (STA) commonly sends a wildcard/broadcast probe request. In dense deployments, usually multiple access points (APs) will respond to the STA's wildcard request. If two of the APs are hidden nodes, then the probe response frames sent by the two APs may collide with each other at the STA causing the two APs to retransmit the probe response frames.

Inappropriate modulation and coding scheme (MCS) selection, particularly an aggressive MCS selection, can also cause packet loss or packet error. Aggressive selection of MCS can lead to potentially higher packet error rate (PER), more retransmissions, and lower goodput (i.e., (1−PER)*(Data Rate)). Other causes of packet loss and packet error include frame type specific issues. For example, an AP may continue to retransmit deassociation frames or deauthentication frames to a STA due to an absence of an ACK from the STA since the STA has already left the BSS of the AP.

Another cause for packet loss and packet error may be a weak uplink signal due to the fact that the STA is at a cell boundary and is moving away from the AP. In such a scenario, the AP may not receive an ACK transmitted by the STA. For example, the AP may not receive an ACK for probe response frames transmitted by the AP, which may cause the AP to retransmit the probe response frames. Also, if the STA is moving away from the AP but continues to associate (stick) with the AP, many retransmissions of uplink RTS frames can occur.

SUMMARY

A wireless device comprises a metric generating module and a parameter selecting module. The metric generating module is configured to generate a first metric based on (i) a number of frames retransmitted over a first time period, and (ii) a total number of frames transmitted over the first time period. The metric generating module is configured to generate a second metric based on (i) a number of frames received more than once over a second time period, and (ii) a total number of frames received over the second time period. The parameter selecting module is configured to select one or more transmission parameters to transmit data based on one or more of the first metric and the second metric.

In another feature, the one or more transmission parameters include a modulation and coding scheme used to transmit the data.

In another feature, the parameter selecting module is configured to select the one or more transmission parameters based on one or more of a signal-to-noise ratio, a packet error rate, a retransmission ratio, a receiving duplication ratio, and a modulation and coding scheme previously used to transmit the data.

In another feature, the parameter selecting module is configured to select the one or more transmission parameters based on a predetermined performance goal. The predetermined performance goal includes one or more of a predetermined goodput and a predetermined maximum allowed number of retransmissions during a predetermined time period.

In still other features, a system comprises a congestion measuring module and a transmitting module. The congestion measuring module is configured to measure a congestion level of a frequency channel. The transmitting module is configured to determine whether or not to transmit a probe request over the frequency channel based on the congestion level of the frequency channel.

In another feature, a wildcard probe request is allowed to be transmitted over the frequency channel in response to the congestion level of the frequency channel being less than or equal to a predetermined congestion level.

In other features, in response to the congestion level of the frequency channel being greater than a predetermined congestion level, the transmitting module is configured to not transmit the probe request over the frequency channel; and the system further comprises a receiving module configured to wait to receive a frame including information of an access point over the frequency channel.

In another feature, the system further comprises a selecting module configured to select a different frequency channel to scan in response to the congestion level of the frequency channel being greater than a predetermined congestion level.

In another feature, the congestion measuring module is configured to measure the congestion level of the frequency channel based on one or more of a wait time to access the frequency channel, a number of backoffs performed during an attempt to access the frequency channel, and utilization of the frequency channel.

In still other features, a wireless device comprises a receiving module and a transmitting module. The receiving module is configured to receive a probe response from an access point in response to transmitting a probe request, where the probe response is a unicast frame. The receiving module is configured to process the probe response as a broadcast frame not requiring transmission of the acknowledgement instead of processing the probe response as a unicast frame requiring transmission of the acknowledgement. The transmitting module is configured to not transmit the acknowledgement to the access point in response to receiving the probe response.

In another feature, the receiving module does not receive the probe response again from the access point in response to not transmitting the acknowledgement to the access point.

In still other features, a system comprises a signal strength measuring module and a transmitting module. The signal strength measuring module is configured to measure strength of a signal received from a remote device. The transmitting module is configured to, in response to the strength of the signal received from the remote device being less than or equal to a predetermined threshold, not retransmit a frame to the remote device, or limit a number of retransmissions of the frame to the remote device to two.

In another feature, the frame includes a deauthentication frame or a deassociation frame for the remote device.

In still other features, a wireless device comprises a receiving module and a transmitting module. The receiving module is configured to receive a first frame from a remote device, where the first frame includes a probe request. The transmitting module is configured to transmit a second frame to the remote device in response to receiving the first frame from the remote device, where the second frame includes a probe response. The transmitting module is configured to not retransmit the second frame to the remote device regardless of whether or not the receiving module receives an acknowledgement from the remote device for the remote device receiving the second frame.

In still other features, a wireless device comprises a transmitting module and a receiving module. The transmitting module is configured to transmit a first frame to a remote device. The receiving module is configured to receive a second frame from the remote device in response to transmitting the first frame to the remote device. The transmitting module is configured to limit a number of retransmissions of the first frame to the remote device to two in response to (i) the receiving module not receiving the second frame from the remote device, (ii) the first frame including a request to send frame, and (iii) the second frame including a clear to send frame.

In another feature, the wireless device further comprises a selecting module configured to select one or more of a different frequency channel and a different basic service set in response to (i) not receiving the second frame from the remote device, (ii) the first frame including the request to send frame, (iii) the second frame including the clear to send frame, and (iv) the number of retransmissions of the first frame to the remote device being equal to two.

In still other features, a wireless device comprises a detecting module, a contention module, and a selecting module. The detecting module is configured to detect whether an error occurs in transmitting a packet to a remote device. The contention module is configured to change, in response to the error occurring due to a collision, a contention window without changing a modulation and coding scheme used to transmit packets, The selecting module is configured to select, in response to the error occurring due to link quality, a different modulation and coding scheme to transmit packets without changing the contention window.

In another feature, the detecting module is configured to detect the error based on receiving from the remote device (i) a negative acknowledgment, (ii) a frame other than an acknowledgment for the packet, or (iii) feedback about the error.

In still other features, a system comprises a metric generating module, a congestion measuring module, and a selecting module. The metric generating module is configured to generate a first metric based on a number of frames retransmitted over a first time period and a total number of frames transmitted over the first time period via a frequency channel. The metric generating module is configured to generate a second metric based on a number of frames received more than once over a second time period and a total number of frames received over the second time period via the frequency channel. The congestion measuring module is configured to measure a congestion level of the frequency channel. The selecting module is configured to select one or more of a different frequency channel and a different basic service set based on one or more of (i) the first metric, (ii) the second metric, and (iii) the congestion level.

In another feature, the selecting module is configured to select the one or more of the different frequency channel and the different basic service set in response to the one or more of (i) the first metric, (ii) the second metric, and (iii) the congestion level being greater than or equal to respective predetermined thresholds.

In still other features, the system further comprises a tracking module configured to track a plurality of frequency channels and a plurality of basic service sets in which the wireless device operated prior to selecting the one or more of the different frequency channel and the different basic service set. The tracking module configured to track a frequency and duration of operation of the wireless device in the plurality of frequency channels and the plurality of basic service sets. The selecting module is configured to select the one or more of the different frequency channel and the different basic service set from the plurality of frequency channels and the plurality of basic service sets based on the frequency and duration of operation of the wireless device in the plurality of frequency channels and the plurality of basic service sets.

In still other features, a method for a wireless device comprises generating a first metric based on (i) a number of frames retransmitted over a first time period, and (ii) a total number of frames transmitted over the first time period. The method further comprises generating a second metric based on (i) a number of frames received more than once over a second time period, and (ii) a total number of frames received over the second time period. The method further comprises selecting one or more transmission parameters to transmit data based on one or more of the first metric and the second metric.

In another feature, the one or more transmission parameters include a modulation and coding scheme used to transmit the data.

In another feature, the method further comprises selecting the one or more transmission parameters based on one or more of a signal-to-noise ratio, a packet error rate, a retransmission ratio, a receiving duplication ratio, a modulation and coding scheme previously used to transmit the data.

In another feature, the method further comprises selecting the one or more transmission parameters based on a predetermined performance goal. The predetermined performance goal includes one or more of a predetermined goodput and a predetermined maximum allowed number of retransmissions during a predetermined time period.

In still other features, a method comprises measuring a congestion level of a frequency channel, and determining whether or not to transmit a probe request over the frequency channel based on the congestion level of the frequency channel.

In another feature, the method further comprises allowing a wildcard probe request to be transmitted over the frequency channel in response to the congestion level of the frequency channel being less than or equal to a predetermined congestion level.

In another feature, the method further comprises in response to the congestion level of the frequency channel being greater than a predetermined congestion level, not transmitting the probe request over the frequency channel, and waiting to receive a frame including information of an access point over the frequency channel.

In another feature, the method further comprises selecting a different frequency channel to scan in response to the congestion level of the frequency channel being greater than a predetermined congestion level.

In another feature, the method further comprises measuring the congestion level of the frequency channel based on one or more of a wait time to access the frequency channel, a number of backoffs performed during an attempt to access the frequency channel, and utilization of the frequency channel.

In still other features, a method for a wireless device comprises receiving a probe response from an access point in response to transmitting a probe request. The method further comprises processing the probe response as a broadcast frame not requiring transmission of an acknowledgement instead of processing the probe response as a unicast frame requiring transmission of the acknowledgement. The method further comprises not transmitting the acknowledgement to the access point in response to receiving the probe response.

In another feature, the method further comprises not receiving the probe response again from the access point in response to not transmitting the acknowledgement to the access point.

In still other features, a method comprises measuring strength of a signal received from a remote device; and in response to the strength of the signal received from the remote device being less than or equal to a predetermined threshold, not retransmitting a frame to the remote device, or limiting a number of retransmissions of the frame to the remote device to two.

In another feature, the frame includes a deauthentication frame or a deassociation frame for the remote device.

In still other features, a method for a wireless device comprises receiving a first frame from a remote device, where the first frame includes a probe request. The method further comprises transmitting a second frame to the remote device in response to receiving the first frame from the remote device, where the second frame includes a probe response. The method further comprises not retransmitting the second frame to the remote device regardless of whether or not the wireless device receives an acknowledgement from the remote device for the remote device receiving the second frame.

In still other features, a method for a wireless device comprises transmitting a first frame to a remote device, and receiving a second frame from the remote device in response to transmitting the first frame to the remote device. The method further comprises limiting a number of retransmissions of the first frame to the remote device to two in response to (i) not receiving the second frame from the remote device, (ii) the first frame including a request to send frame, and (iii) the second frame including a clear to send frame.

In another feature, the method further comprises selecting one or more of a different frequency channel and a different basic service set in response to (i) not receiving the second frame from the remote device, (ii) the first frame including the request to send frame, (iii) the second frame including the clear to send frame, and (iv) the number of retransmissions of the first frame to the remote device being equal to two.

In still other features, a method for a wireless device comprises detecting whether an error occurs in transmitting a packet to a remote device. The method further comprises changing, in response to the error occurring due to a collision, a contention window without changing a modulation and coding scheme used to transmit packets. The method further comprises selecting, in response to the error occurring due to link quality, a different modulation and coding scheme to transmit packets without changing the contention window.

In another feature, the method further comprises detecting the error based on receiving from the remote device (i) a negative acknowledgment, (ii) a frame other than an acknowledgment for the packet, or (iii) feedback about the error.

In still other features, a method for a wireless device comprises generating a first metric based on a number of frames retransmitted over a first time period and a total number of frames transmitted over the first time period via a frequency channel. The method further comprises generating a second metric based on a number of frames received more than once over a second time period and a total number of frames received over the second time period via the frequency channel. The method further comprises measuring a congestion level of the frequency channel; and selecting one or more of a different frequency channel and a different basic service set based on one or more of (i) the first metric, (ii) the second metric, and (iii) the congestion level.

In another feature, the method further comprises selecting the one or more of the different frequency channel and the different basic service set in response to the one or more of (i) the first metric, (ii) the second metric, and (iii) the congestion level being greater than or equal to respective predetermined thresholds.

In another feature, the method further comprises tracking a plurality of frequency channels and a plurality of basic service sets in which the wireless device operated prior to selecting the one or more of the different frequency channel and the different basic service set. The method further comprises tracking a frequency and duration of operation of the wireless device in the plurality of frequency channels and the plurality of basic service sets. The method further comprises selecting the one or more of the different frequency channel and the different basic service set from the plurality of frequency channels and the plurality of basic service sets based on the frequency and duration of operation of the wireless device in the plurality of frequency channels and the plurality of basic service sets.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 6 is a flowchart of a method for reducing frame retransmissions by eliminating transmission of acknowledgment (ACK) for a probe response from a STA and by eliminating retransmission of probe responses from an AP according to the present disclosure.

FIG. 7 is a flowchart of a method for reducing frame retransmissions by not retransmitting probe responses from an AP upon not receiving an ACK from a STA for a probe response transmitted from the AP according to the present disclosure.

In the drawings, reference numbers may be reused to identify similar and/or identical elements.

DESCRIPTION

Frame retransmissions in wireless local area networks can be reduced (mitigated) in many ways. For example, retransmissions can be reduced by properly selecting a modulation and coding scheme (MCS) and adapting data rates for transmissions and retransmissions. Retransmissions can also be mitigated by combining decoding of multiple transmissions (e.g., by using chase-combining hybrid automatic repeat request (HARQ)). Retransmissions can also be mitigated by sending a unicast negative acknowledgement (NAK) frame when a packet error is detected.

The present disclosure relates to various schemes for reducing frame retransmissions. Specifically, four different schemes for mitigating frame retransmissions are disclosed. The disclosure is organized as follows. First, an enhanced MCS selection and rate adaptation scheme based on novel metrics is discussed. Second, several frame type specific schemes are described. These schemes include controlling transmissions of wildcard probe request, not transmitting an ACK frame for probe response, not retransmitting or reducing a number of retransmissions of some MAC management frames (e.g., deauthentication frames, deassociation frames, etc.), and reducing a number of retransmissions of RTS frames. Third, a differentiated backoff scheme is disclosed, where different actions are performed in response to different causes of retransmissions. Fourth, schemes for triggering channel/BSS reselection based on the novel metrics are discussed.

Figure 1:
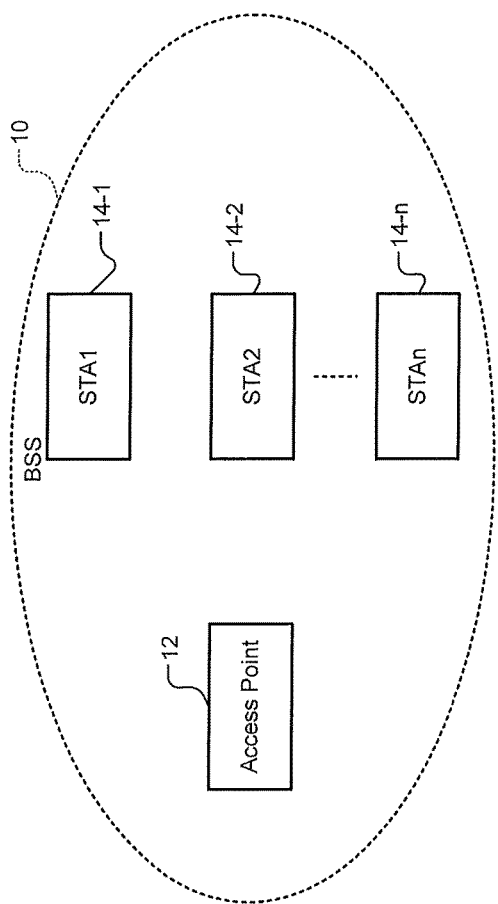
FIG. 1 depicts a basic service set (BSS) including an access point (AP) and a plurality of client stations (STAs).

FIG. 1 shows a basic service set (BSS) 10. The BSS 10 includes an access point (AP) 12. Additionally, the BSS 10 includes a plurality of client stations STA1 14-1, STA2 14-2, . . . , and STAn 14-n, where n is an integer greater than one (collectively STAs 14). The BSS 10 can be part of a high-efficiency wireless local area network (HEW).

Figure 2:
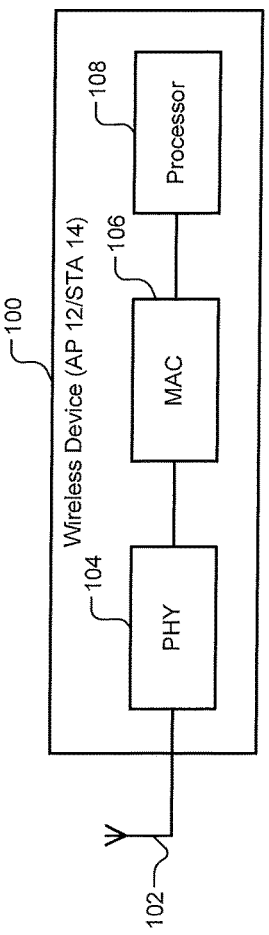
FIG. 2 is a block diagram of a wireless device (e.g., the AP or the STA of FIG. 1).

FIG. 2 shows a wireless device 100 (e.g., the AP 12 or the STA 14) including an antenna 102, a physical layer (PHY) 104, a medium access controller (MAC) 106, and a processor 108. While a single antenna 102 is shown, the wireless device 100 may include a plurality of antennas. For example, the plurality of antennas may be arranged in a multiple-input multiple-output (MIMO) configuration. The PHY 104 interfaces the wireless device 100 with the medium via the antenna 102. The MAC 106 controls access by the wireless device 100 to the medium. The processor 108 processes packets that are received and that are to be transmitted via the antenna 102.

Figure 3:
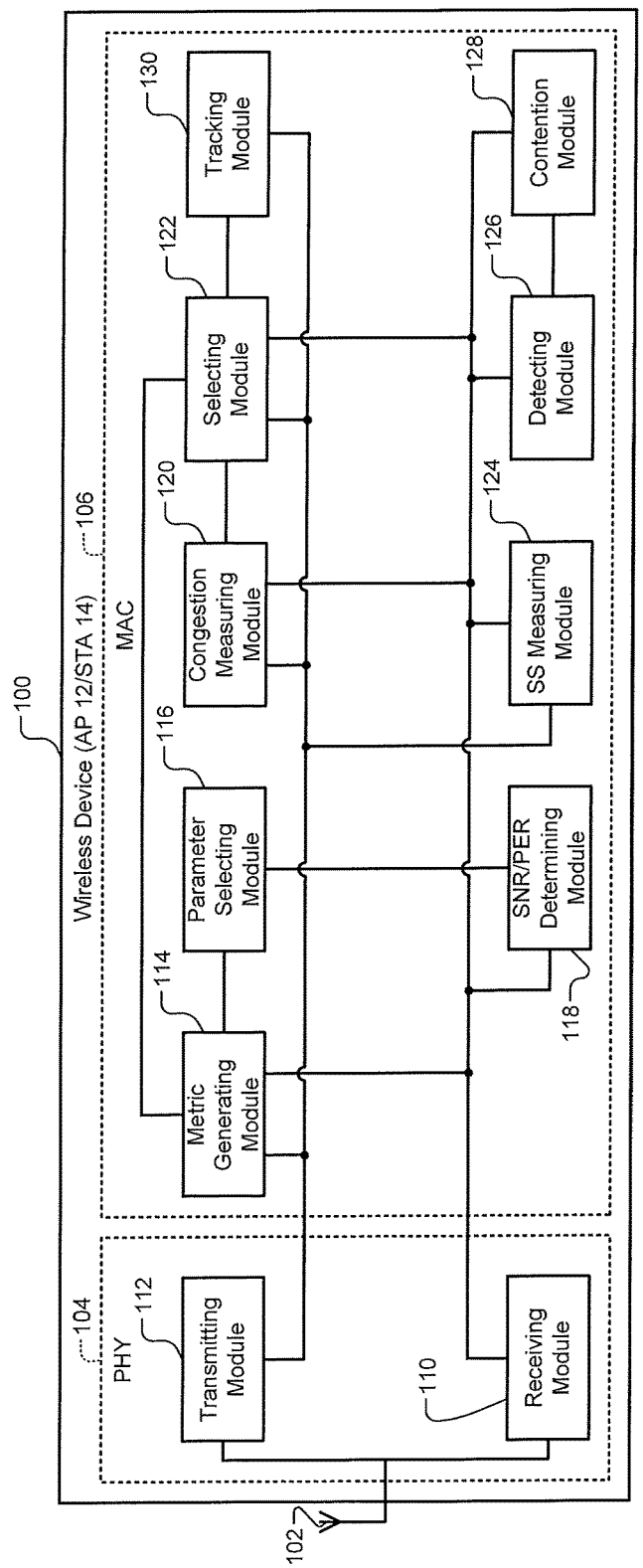
FIG. 3 is a detailed block diagram of the wireless device of FIG. 2.

FIG. 3 shows the wireless device 100 (e.g., the AP 12 or the STA 14) in further detail. The PHY 104 includes a receiving module 110 and a transmitting module 112. The receiving module 110 receives packets via the antenna 102. The transmitting module 112 transmits packets via the antenna 102. The MAC 106 includes a metric generating module 114, a parameter selecting module 116, a SNR/PER determining module 118, a congestion measuring module 120, a selecting module 122, a signal strength measuring module 124, a detecting module 126, a contention module 128, and a tracking module 130. Operations of these modules are described below with references to FIGS. 4-11. In some implementations, one or more modules of the PHY 104 may be included in the MAC 106 while one or more modules of the MAC 106 may be included in the PHY 104.

The modules of the wireless device 100 perform operations described below for both an AP and a STA (i.e., regardless of whether the wireless device 100 is implemented as the AP 12 or the STA 14) except where the description of a module specifically states that the module performs the described operations only for an AP (i.e., only when the wireless device 100 is implemented as the AP 12) or only for a STA (i.e., only when the wireless device 100 is implemented as the STA 14). As the following description clarifies, some modules (e.g., the selecting module 122) may perform some operations (e.g., selecting a different BSS) only in a STA (i.e., only when the wireless device 100 is implemented as the STA 14) and not in an AP (e.g., the selecting module 122 may only select a different channel but may not select a different BSS in the AP 12). Further, some modules (e.g., the transmitting module 112) may perform some operations (e.g., not retransmitting probe response) only in an AP (i.e., only when the wireless device 100 is implemented as the AP 12) and not in a STA.

Figure 4:
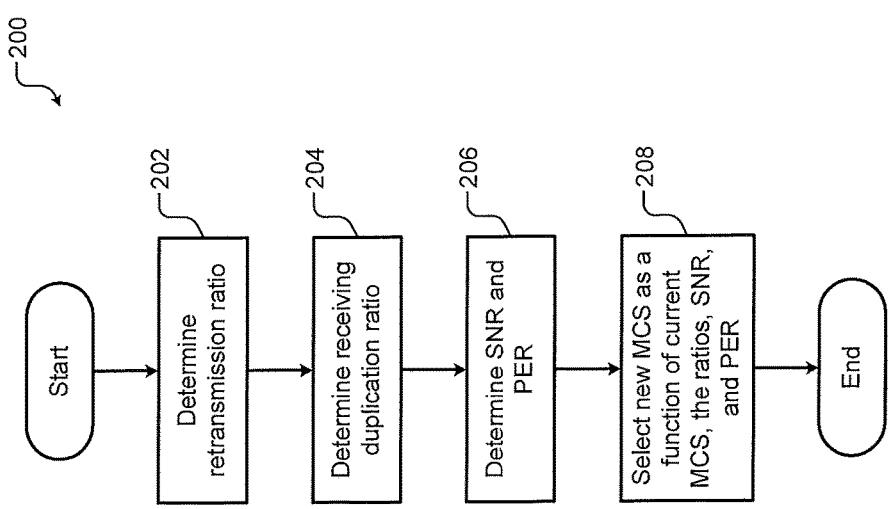
FIG. 4 is a flowchart of a method for reducing frame retransmissions using novel metrics according to the present disclosure.

FIG. 4 shows a method 200 for reducing frame retransmissions based on novel metrics according to the present disclosure. At 202, the metric generating module 114 generates a first metric called a retransmission ratio (ReTxR). The retransmission ratio is a ratio of a number of frames retransmitted by the transmitting module 112 over a period of time to a total number of frames transmitted by the transmitting module 112 over the period of time. At 204, the metric generating module 114 generates a second metric called a receiving duplication ratio (RxDuR). The receiving duplication ratio is a ratio of a number of frames received more than once by the receiving module 110 over a period of time to a total number of frames received by the receiving module 110 over the period of time.

At 206, the SNR/PER determining module 118 determines SNR and PER. At 208, the parameter selecting module 116 selects a new MCS as a function of a current MCS, the first and second metrics, the SNR, and the PER. By selecting the new MCS, the parameter selecting module 116 implicitly selects a data rate at which data is transmitted based on the first and second metrics, the SNR, and the PER.

The MCS selection function is a self-learning and refining function. The MCS selection function starts with a mapping of SNR to MCS that is derived based on theoretical calculations or previous associations of the wireless device 100. Then the MCS selection function monitors the wireless link and collects measurements of SNR, PER, ReTxR, and RxDuR. The MCS selection function uses the collected measurements to adjust the MCS selection function to meet a predetermined performance goal (e.g., maximize the goodput, minimize retransmissions, etc.). The parameters SNR, PER, ReTxR, and RxDuR can be moving-window average values, value ranges, or threshold values. The refining of the MCS selection function can be performed periodically or in an event-driven manner.

Figure 5:
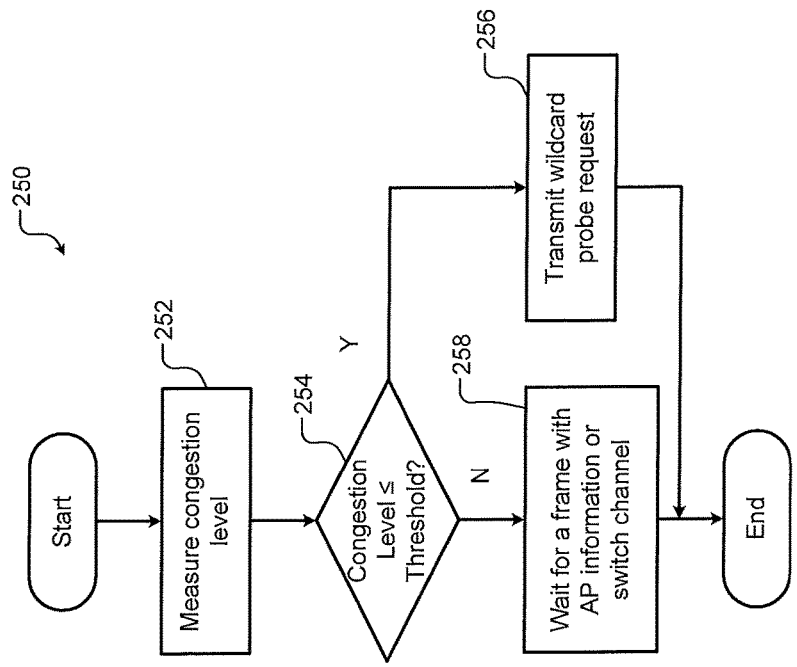
FIG. 5 is a flowchart of a method for controlling transmission of a wildcard probe request according to the present disclosure.

FIG. 5 shows a method 250 for controlling transmission of a wildcard probe request according to the present disclosure. A wildcard probe request is a probe request that causes a plurality of access points to transmit a probe response. In other words, a wildcard probe request is a probe request in response to which each of a plurality of access points transmits a probe response. At 252, the congestion measuring module 120 measures a congestion level of the frequency channel in which the wireless device 100 is operating. For example, the congestion measuring module 120 measures the congestion level based on one or more of a wait time to access the frequency channel, a number of backoffs performed during an attempt to access the frequency channel, and utilization of the frequency channel.

At 254, when the wireless device 100 (e.g., the STA 14) starts active scanning and needs to send a wildcard probe request, the congestion measuring module 120 determines whether the congestion level is less than or equal to a predetermined threshold. At 256, the transmitting module 112 transmits a wildcard probe request only if the measured congestion level is less than or equal to the predetermined threshold. At 258, if the measured congestion level is not less than or equal to the predetermined threshold, the wireless device 100 (e.g., the STA 14) waits to receive a frame such as a beacon or other broadcast frame that includes AP information, or the selecting module 122 of the STA 14 selects a different frequency channel in which to operate the wireless device 100 (e.g., the STA 14).

FIG. 6 shows a method 300 for reducing frame retransmissions by eliminating transmission of an acknowledgment (ACK) for a probe response from a STA and by eliminating retransmission of probe responses from an AP according to the present disclosure. At 302, the transmitting module 112 of the STA 14 transmits a probe request to the AP 12. At 304, the receiving module 110 of the STA 14 receives a probe response from the AP 12. The receiving module 110 of the STA 14 processes the probe response as a broadcast frame that does not require transmission of an ACK instead of processing the probe response as a unicast frame that requires transmission of an ACK. At 306, the transmitting module 112 of the STA 14 does not transmit an ACK for the probe response received from the AP 12. In response to the receiving module 110 of the AP 12 not receiving an ACK from the STA 14, the transmitting module 112 of the AP 12 does not retransmit the probe response. At 308, the receiving module 110 of the STA 14 does not again receive the probe response from the AP 12.

FIG. 7 shows a method 320 for reducing frame retransmissions by not retransmitting probe responses from an AP in response to not receiving an ACK from a STA for a probe response transmitted from the AP according to the present disclosure. At 322, the receiving module 110 of the AP 12 receives a probe request from the STA 14. At 324, the transmitting module 112 of the AP 12 transmits a probe response. Regardless of whether the probe response is transmitted as a unicast frame or a broadcast/multicast frame, the AP 12 will not wait for an ACK for the transmitted probe response. Thus, the transmitting module 112 of the AP 12 does not retransmit the probe response.

Figure 8:
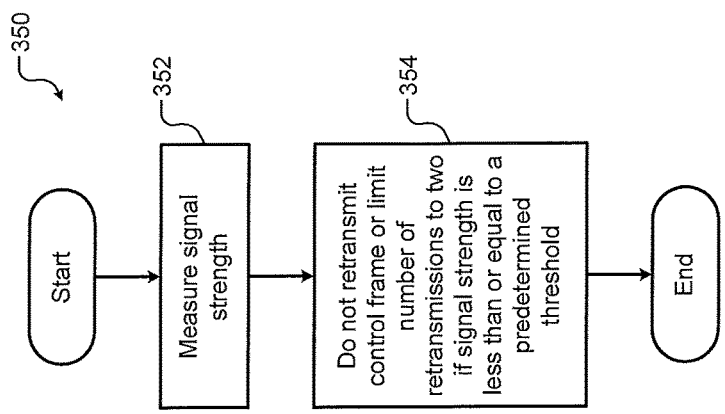
FIG. 8 is a flowchart of a method for reducing frame retransmissions by not retransmitting frames or by limiting the number of retransmissions of frames from an AP to a STA that may have left the BSS of the AP according to the present disclosure.

FIG. 8 shows a method 350 for reducing frame retransmissions by not retransmitting frames or by limiting the number of retransmissions of frames from an AP to a STA that may have left the BSS of the AP according to the present disclosure. At 352, the signal strength measuring module 124 of the AP 12 measures the signal strength of a signal received by the receiving module 110 of the AP 12 from the STA 14. At 354, if the signal strength is less than or equal to a predetermined threshold (indicating that the STA 14 may have already left the BSS of the AP 12), the transmitting module 112 of the AP 12 does not retransmit a control frame (e.g., a deassociation frame or a deauthentication frame) to the STA 14, or limits the number of retransmissions of the control frame to the STA 14 to a predetermined number (e.g., two) that is less than the number specified in the respective standard.

Figure 9:
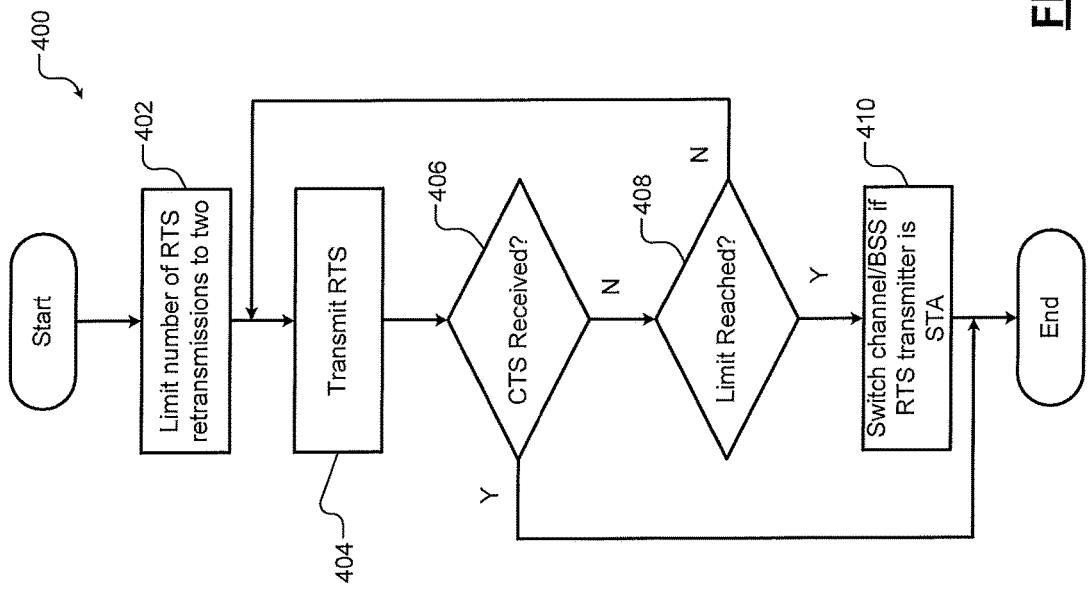
FIG. 9 is a flowchart of a method for reducing frame retransmissions by limiting the number of retransmissions of request-to-send (RTS) frames according to the present disclosure.

FIG. 9 shows a method 400 for reducing frame retransmissions by limiting the number of retransmissions of RTS frames according to the present disclosure. At 402, the transmitting module 112 limits the number of RTS retransmissions to a predetermined number (e.g., two) that is less than the number specified in the respective standard. At 404, the transmitting module transmits an RTS frame. At 406, the receiving module 110 determines if a CTS frame is received in response to the transmitted RTS frame. At 408, if a CTS frame is not received in response to the transmitted RTS frame, the transmitting module 112 determines if the number of RTS frames transmitted is less than or equal to the limit (i.e., the predetermined number; e.g., two). Control returns to 404 if the number of RTS frames transmitted is less than or equal to the limit. At 410, if the number of RTS frames transmitted is not less than or equal to the limit, the selecting module 122 of the STA 14 (i.e., the transmitter of the RTS frame) initiates a procedure to select a different frequency channel and/or a different BSS (i.e., a BSS of an AP other than the AP 12) in which to operate the STA 14.

Figure 10:
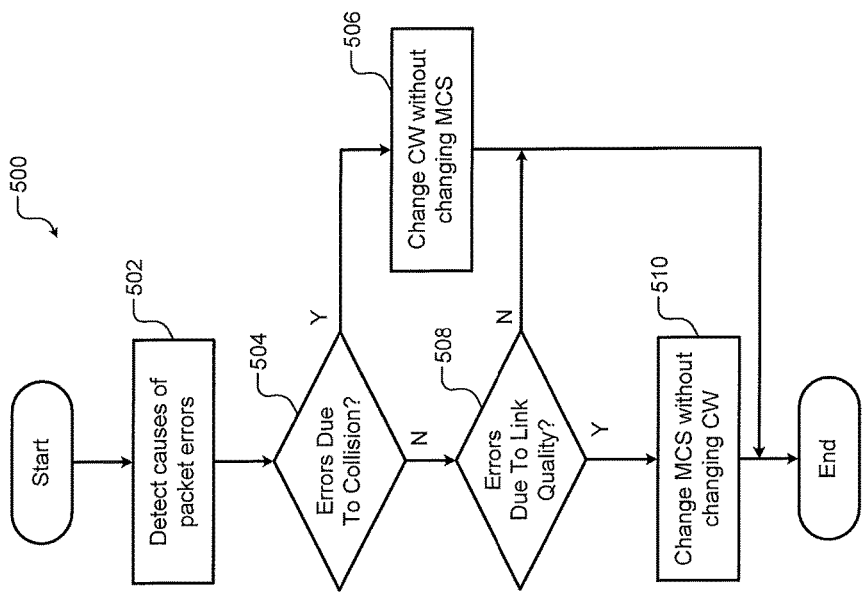
FIG. 10 is a flowchart of a method for reducing frame retransmissions by performing a differentiated backoff procedure according to the present disclosure.

FIG. 10 shows a method 500 for reducing frame retransmissions by performing a differentiated backoff procedure according to the present disclosure. At 502, the detecting module 126 detects one or more causes of packet errors. For example, the detecting module 126 detects whether an error occurred in transmitting a packet based on receiving one or more of the following from the device to which the packet is transmitted: a negative acknowledgment (NAK), which includes error information; a frame other than an expected acknowledgment for the transmitted packet, which indicates that the transmitted packet may be lost; or feedback about the error.

At 504, the detecting module 126 detects whether the errors occurred due to collisions. At 506, if the errors occurred due to collisions, the contention module 128 changes (e.g., increases) a contention window without changing the MCS used to transmit packets. At 508, the detecting module 126 determines whether the errors occurred due to poor link quality. At 510, if the errors occurred due to poor link quality, the selecting module 122 selects a different MCS to transmit packets without changing the contention window.

Figure 11:
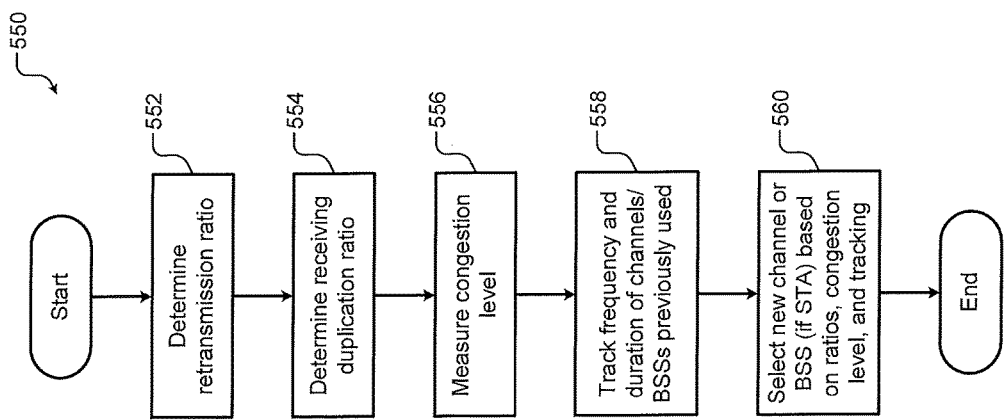
FIG. 11 is a flowchart of a method for reducing frame retransmissions by triggering channel/BSS reselection based on the novel metrics according to the present disclosure.

FIG. 11 shows a method 550 for reducing frame retransmissions by triggering channel/BSS reselection based on the novel metrics according to the present disclosure. At 552, the metric generating module 114 generates a first metric called a retransmission ratio (ReTxR). The retransmission ratio is a ratio of a number of frames retransmitted by the transmitting module 112 over a period of time to a total number of frames transmitted by the transmitting module 112 over the period of time. At 554, the metric generating module 114 generates a second metric called a receiving duplication ratio (RxDuR). The receiving duplication ratio is a ratio of a number of frames received more than once by the receiving module 110 over a period of time to a total number of frames received by the receiving module 110 over the period of time. At 556, the congestion measuring module 120 measures a congestion level of the frequency channel in which the wireless device 100 is operating.

At 558, the tracking module 130 tracks a frequency and duration of operation of the wireless device 100 in one or more channels/BSSs in which the wireless device 100 has operated in the past. In other words, the tracking module 130 tracks the channels and/or BSSs in which the wireless device 100 has operated in the past, the number of times the wireless device 100 operated in a particular channel and/or a particular BSS, the number of times the wireless device 100 changed operation to and/or from a particular channel or BSS, and the duration for which the wireless device 100 operated in a particular channel and/or BSS.

At 560, the selecting module 122 decides based on the ratios (i.e., metrics) and the channel congestion whether to select a different channel/BSS. The selecting module 122 decides to select a different channel/BSS if one or more of the ratios and the channel congestion are greater than or equal to respective predetermined thresholds. If a different channel/BSS is to be selected, the selecting module 122 identifies and selects a proper channel/BSS based on the information tracked by the tracking module 130. The information tracked by the tracking module 130 helps in avoiding an unstable channel/BSS switching (e.g., a ping-pong like effect; i.e., switching back and forth between channels/BSSs in which the wireless device 100 operated in the past for a short duration and frequently changed the channel/BSS).

The selecting module 122 of the AP 12 uses this scheme to select a different frequency channel. The selecting module 122 of the STA 14 uses this scheme to select a different frequency channel and/or a different BSS. This scheme can effectively solve multiple performance issues including numerous retransmissions and issues related to STAs that tend to stick with an AP while moving away from the AP although one or more APs with a better link quality than the quality of link with the AP 12 are available to the STA for association.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A wireless device comprising:
a processor; and
a non-transitory computer-readable medium to store instructions for execution by the processor, the instructions configured to:
generate a first metric based on (i) a number of frames retransmitted from the wireless device over a first time period, and (ii) a total number of frames transmitted from the wireless device over the first time period;
generate a second metric based on (i) a number of frames received at the wireless device more than once over a second time period, and (ii) a total number of frames received at the wireless device over the second time period; and
select a new modulation and coding scheme to transmit data from the wireless device based on the first metric and the second metric, a signal-to-noise ratio, a packet error rate, and a current modulation and coding scheme used to transmit data from the wireless device.

2. The wireless device of claim 1, wherein the instructions are further configured to select the new modulation and coding scheme based on a predetermined performance goal, wherein the predetermined performance goal includes one or more of a predetermined goodput and a predetermined maximum allowed number of retransmissions during a predetermined time period.

3. The wireless device of claim 1, wherein the instructions are further configured to select the new modulation and coding scheme to transmit data from the wireless device based on the first metric and the second metric, the signal-to-noise ratio, the packet error rate, and the current modulation and coding scheme to reduce frame retransmissions.

* * * * *